UNITED STATES PATENT OFFICE.

LEWIS A. SMITH, OF CINCINNATI, OHIO, ASSIGNOR TO HIMSELF AND GEORGE BURROWS, OF SAME PLACE.

IMPROVED SHELLAC VARNISH.

Specification forming part of Letters Patent No. 56,151, dated July 3, 1866.

*To all whom it may concern:*

Be it known that I, LEWIS A. SMITH, of Cincinnati, Hamilton county, Ohio, have invented a new and useful Shellac Varnish, of which the following is a full, clear, and exact description.

My invention relates to a manufacture of shellac varnish which dispenses with the employment of alcohol or other inflammable and costly solvent of like character, can be prepared at less than one-fourth of the customary cost, fills up the pores of the wood better and keeps cleaner than the customary varnish, brings out the grain of the wood or leather in a superior manner, can be used with wood, paper, or leather, can be reduced to any consistency by water, and is not inflammable.

In one gallon of boiling water (preferably rain or distilled) I insert one-half table-spoonful of bicarbonate of soda or common baking-soda, to which I add a pound of shellac, and stir well until a scum appears, when the remainder of the table-spoonful of soda is added in small quantities until the scum disappears, when it is ready for use.

I claim as a new article of manufacture—

A varnish compounded of shellac and bicarbonate of soda in any suitable proportions, substantially as set forth.

In testimony of which invention I hereunto set my hand.

LEWIS A. SMITH.

Witnesses:
FRANK MILLWARD,
JAMES H. LAYMAN.